(12) United States Patent
Okado (10) Patent No.: US 6,574,282 B1
(45) Date of Patent: Jun. 3, 2003

(54) MULTI-CARRIER TRANSMISSION SYSTEM, TRANSMISSION UNIT AND TRANSMISSION METHOD

(75) Inventor: Hiroshi Okado, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/256,361

(22) Filed: Feb. 24, 1999

(30) Foreign Application Priority Data

Feb. 27, 1998 (JP) ............................ 10-046534
Dec. 24, 1998 (JP) ............................ 10-366981

(51) Int. Cl.$^7$ ............................ H04K 1/10; H04L 27/28
(52) U.S. Cl. ...................................... 375/260; 370/464
(58) Field of Search ................................ 375/224, 225, 375/227, 259, 260, 261, 285, 296, 346, 349; 370/206, 210, 464, 480

(56) References Cited

U.S. PATENT DOCUMENTS

| 5,479,447 | A |   | 12/1995 | Chow et al. | |
|---|---|---|---|---|---|
| 5,774,500 | A | * | 6/1998 | Zogakis et al. | |
| 6,005,893 | A | * | 12/1999 | Hyll | 370/468 |
| 6,035,000 | A | * | 3/2000 | Bingham | 375/296 |

FOREIGN PATENT DOCUMENTS

| EP | 0753947 A1 | 1/1997 |
|---|---|---|
| GB | 2300546 A | 11/1996 |
| JP | 8-251117 | 9/1996 |
| JP | 8-307385 | 11/1996 |
| JP | 9-27832 | 1/1997 |
| JP | 9-51328 | 2/1997 |

* cited by examiner

Primary Examiner—Jean Corrielus
(74) Attorney, Agent, or Firm—Sughrue Mion, PLLC

(57) ABSTRACT

In a condition where periodically varying noise is generated, multi-carrier transmission is efficiently performed. On a central office (XTU-C), a tone of tone generating portion is transmitted with controlling level by a clock synchronized with a noise. On a terminal (XTU-R), a clock period is detected by a clock detector. A pseudo random signal (including all carriers) is transmitted from a pseudo random signal generating portion on the side of central office. On the side of terminal, an SNR of carriers per previously detected clock period (noise period) is measured by an SNR measuring portion. According to a result of measurement, power/bit distribution of each carrier is derived by a power/bit distribution calculating portion to store as a demapping information upon down carrier transmission. Also, the power/bit distribution is also transmitted to central office to be stored in a mapping portion of the central office. By this, down transmission is performed. Up transmission is also performed in the similar manner.

39 Claims, 6 Drawing Sheets

MULTI-CARRIER TRANSMISSION SYSTEM, TRANSMISSION UNIT AND TRANSMISSION METHOD

BACKGROUND OF THE INVENTION

1. Field of the Invention

The present invention relates generally to a multi-carrier transmission system a transmission unit and a transmission method. More particularly, the invention relates to a multi-carrier transmission system, a transmission unit and a transmission method known as a Discrete Multi-Tone (DMT) modulation system.

2. Description of the Related Art

As an example of the conventional DMT type multi-carrier transmission system of this kind, there is a technology disclosed in U.S. Pat. No. 5,479,447. Such multi-carrier transmission system measures a signal to noise ratio (SNR) of respective carriers for bit distribution of a plurality of carriers, and for deriving bit distribution according to the measured SNR.

A problem in such prior art resides in small transmission amount. The reason is that when a periodically varying noise is generated and if communication is to be established at a certain error rate, bit distribution and power distribution is performed with reference to an average value of SNR of each carrier. Thus, bit distribution and power distribution are limited to only one kind of average value of SNR to inherently make the data transmission amount small.

SUMMARY OF THE INVENTION

Therefore, the present invention has been worked out for solving the drawback in the prior art. An object of the present invention to provide a multi-carrier transmission system, a transmission unit and a transmission method, which can efficiently perform data transmission in a condition where a noise is generated periodically.

According to one aspect of the present invention, a multi-carrier transmission system is characterized by performing data transmission by deriving a bit distribution of each carrier of multi-carrier depending upon a periodically varying noise period. Then, the bit distribution of each of the carrier is derived by using a clock synchronized with the periodically varying noise and depending upon a period of the clock. A transmission power distribution of each of the carrier is derived together with the bit distribution of each of the carrier.

Another multi-carrier transmission system according to the present invention, comprises:

a first unit performing quadrature amplitude modulation using each of the carrier and multiplexing modulated carrier using inverse Fourier transformation; and a second unit demodulating each of the carrier from the signal multiplexed in the first unit using Fourier transformation.

On the other hand, the first unit comprises a circuit for transmitting a tone synchronized with the clock with varying level and a circuit for transmitting a pseudo random signal having all components of respective carriers, and the second unit comprises a circuit for detecting a period of noise on the basis of the level of the tone from the first unit, a circuit for deriving a signal to noise ratio of the pseudo random signal per detected period and a circuit for deriving one of a transmission power distribution and bit distribution, and bit distribution of the carrier on the basis of the signal to noise ratio. Then, the second circuit comprises a circuit for transmitting any one of derived transmission power distribution and the bit distribution, and the bit distribution of each of the carrier to the first unit, and the first unit comprises a circuit for performing data transmission to the second unit according to one of the transmission power distribution and bit distribution, and the bit distribution per the noise period from the second unit. The second unit comprises a circuit for transmitting a pseudo random signal having all components of each of the carriers, and the first unit comprises a circuit for deriving a signal to noise ratio of the pseudo random signal from the first unit per each noise period, and a circuit for deriving one of a transmission power distribution and bit distribution, and bit distribution of the carrier on the basis of the signal to noise ratio. The first unit comprises a circuit for transmitting the transmission power distribution and the bit distribution of each of the carriers derived to the second unit, the second unit comprises a circuit for performing data transmission to the first unit according to one of the transmission power distribution and bit distribution, and the bit distribution per the noise period from the first unit. The first unit initiates transmission operation in response to a transmission start command for own unit from the second unit. A data transmission through a digital subscriber line is performed between the first unit and the second unit. The bit distribution is effected to distribute greater number of bits when the noise periodically varying between large and small is small than that when the noise is large. The bit distribution is effected to distribute greater number of bits when the noise periodically varying is far end crosstalk than that when the noise is near end crosstalk.

According to the second aspect of the present invention, a multi-carrier transmission unit performing transmission by multi-carrier, characterized by performing data transmission by deriving a bit distribution of each carrier of multi-carrier depending upon a period of periodically varying noise. The bit distribution of each of the carrier is derived by using a clock synchronized with the periodically varying noise and depending upon a period of the clock. A transmission power distribution of each of the carrier is derived together with the bit distribution of each of the carrier. The multi-carrier transmission unit performs quadrature amplitude modulation using the each carrier and multiplies the modulated carrier using inverse Fourier transformation.

On the other hand, the multi-carrier transmission unit further comprises a circuit for transmitting a tone synchronized with the clock with varying level and a circuit for transmitting a pseudo random signal having all components of respective carriers.

The multi-carrier transmission unit further comprises a circuit for detecting a period of noise on the basis of the level of the tone from another unit, a circuit for deriving a signal to noise ratio of the pseudo random signal per detected period and a circuit for deriving one of a transmission power distribution and bit distribution, and bit distribution of the carrier on the basis of the signal to noise ratio. The multi-carrier transmission unit further comprises a circuit for transmitting any one of derived transmission power distribution and the bit distribution, and the bit distribution of each of the carrier to the another unit. The multi-carrier transmission unit further comprises a circuit for deriving a signal to noise ratio of the pseudo random signal from the another unit per each noise period, and a circuit for deriving one of a transmission power distribution and bit distribution, and bit distribution of the carrier on the basis of the signal to noise ratio. The multi-carrier transmission unit further comprises a circuit for transmitting one of the transmission power distribution and the bit distribution, and the bit distribution of each of the carriers derived, to the another unit.

The multi-carrier transmission unit initiates transmission operation in response to a transmission start command for own unit from the another unit. A data transmission through a digital subscriber line is performed between own unit and the another unit. The bit distribution is effected to distribute greater number of bits when the noise periodically varying between large and small is small than that when the noise is large. The bit distribution is effected to distribute greater number of bits when the noise periodically varying is far end crosstalk than that when the noise is near end crosstalk.

According to the third aspect of the present invention, a multi-carrier transmission method characterized by performing data transmission by deriving a bit distribution of each carrier of multi-carrier depending upon a periodically varying noise period. The bit distribution of each of the carrier is derived by using a clock synchronized with the periodically varying noise and depending upon a period of the clock. A transmission power distribution of each of the carrier is derived together with the bit distribution of each of the carrier.

In the method set forth above, quadrature amplitude modulation is performed by using each of the carrier and the modulated carrier is multiplexed using inverse Fourier transformation in a first unit, and each of the carrier is demodulated from the signal multiplexed in the first unit using Fourier transformation in a second unit. In the first unit, a tone is transmitted synchronized with the clock with varying level and a pseudo random signal having all components of respective carriers is transmitted, and in the second unit, a period of noise is detected on the basis of the level of the tone from the first unit, a signal to noise ratio of the pseudo random signal per detected period is derived and one of a transmission power distribution and bit distribution, and bit distribution of the carrier is derived on the basis of the signal to noise ratio.

Also, in the second circuit, any one of derived transmission power distribution and the bit distribution, and the bit distribution of each of the carrier is transmitted to the first unit, and in the first unit, data transmission to the second unit is performed according to one of the transmission power distribution and bit distribution, and the bit distribution per the noise period from the second unit.

Furthermore, in the second unit, a pseudo random signal having all components of each of the carriers is transmitted, and in the first unit, a signal to noise ratio of the pseudo random signal from the first unit per each noise period is derived, and one of a transmission power distribution and bit distribution, and bit distribution of the carrier on the basis of the signal to noise ratio is derived. In the first unit, the transmission power distribution and the bit distribution of each of the carriers derived to the second unit is transmitted, and in the second unit, data transmission to the first unit is performed according to one of the transmission power distribution and bit distribution, and the bit distribution per the noise period from the first unit.

The transmission operation is initiated in response to a transmission start command for own unit from the second unit. A data transmission through a digital subscriber line is performed between the first unit and the second unit. The bit distribution is effected to distribute greater number of bits when the noise periodically varying between large and small is small than that when the noise is large. The bit distribution is effected to distribute greater number of bits when the noise periodically varying is far end crosstalk than that when the noise is near end crosstalk.

In the operation of the present invention, a central office and a terminal forming the transmission system according to the invention, both have a transceiver function for performing mutual transmission. In an initial operation started by connection of the terminal to a transmission line, the power distribution and bit distribution of each carrier is calculated depending upon the noise varying a given period (assumed to be known). Therefore, the period of the noise has to be noticed from the center office side as higher level office to the terminal as lower level office. Accordingly, the level of the tone is transmitted from the center office to the terminal with varying the level by the clock synchronized with noise period.

In the terminal, the clock is generated in synchronism with noise depending upon the level of tone. The SNR of the pseudo random signal including all carriers transmitted from the center office is measured to calculate the power distribution and bit distribution of each carrier per noise period depending upon SNR. Then, the power distribution and bit distribution of each carrier per noise period are transmitted from the center office to the terminal.

In the center office, according to derived power distribution and bit distribution of each carrier per noise period, transmission (down) to the terminal is performed. Concerning up transmission, similar procedure is performed with reverse functions of the center office and the terminal.

Thus, by performing the power distribution and the bit distribution according to the period of noise, bit distribution adapted to the noise becomes possible to realize efficient transmission.

Figure 6:
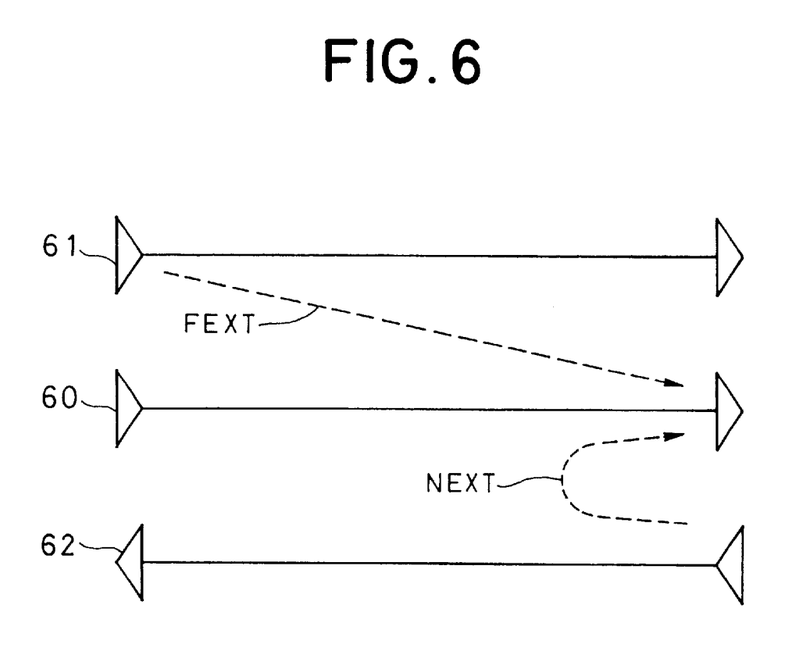
FIG. 6 is an illustration showing a far end crosstalk and a near end crosstalk.

On the other hand, when power distribution and bit distribution of each carrier by measuring the SNR, crosstalk noise has to be considered. In general, crosstalk includes far end crosstalk and near end crosstalk. These will be discussed with reference to FIG. 6. In FIG. 6, the crosstalk taking the signal flowing through the signal line 61 in the same direction as the signal line 60 as an object of measurement, as crosstalk source, is far end cross talk FEXT. Since the signal to be transmitted is attenuated according to transmission distance, the amount of far end crosstalk FEXT is also attenuated depending upon transmission distance. Accordingly, when far end crosstalk FEXT is caused, the SNR should show high value irrespective of transmission distance.

On the other hand, the crosstalk taking the signal line 62, in which the signal flows in the opposite direction to the signal line 60 to be the object of measurement, as crosstalk source, is near end crosstalk NEXT. In contrast to attenuation of the signal to be transmitted according to increasing of the transmission distance, the crosstalk amount of the near end crosstalk NEXT is large in the transmission destination to show low SNR value.

Accordingly, when far end crosstalk with high SNR is caused, power distribution and bit distribution of each carrier is increased, and when near end crosstalk with low SNR is caused, power distribution and bit distribution of each carrier is made small.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

Figure 1:
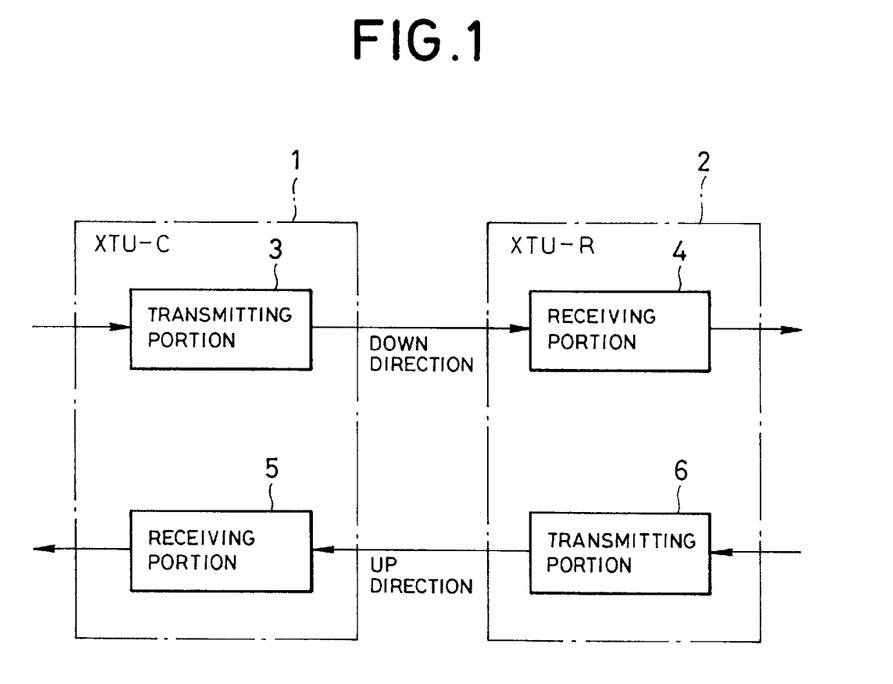
FIG. 1 is a schematic block diagram showing a general construction of a multi-carrier transmission system according to the present invention.

FIG. 1 is an illustration showing general construction of a multi-carrier transmission system according to the present invention, in which XTU-C1 as a central office and XTU-R2 as a terminal are provided, respectively. Transmission between the central office XTU-C1 and the terminal XTU-R2 is performed through a digital subscriber line. It should be noted that XTU-C is XDSL termination unit-center side and XTU-R is XDSL termination unit-remote side. Here, XSDL means X digital Subscriber line, wherein X generally represents A, V, H and so forth.

Both of XTU-C1 and XTU-R2 have transmitting portion 3 and 6 and receiving portions 5 and 4 as major functions, as shown in FIG. 1. Detail of transmitting and receiving functions of these are shown in the block diagram of FIG. 2.

Figure 2:
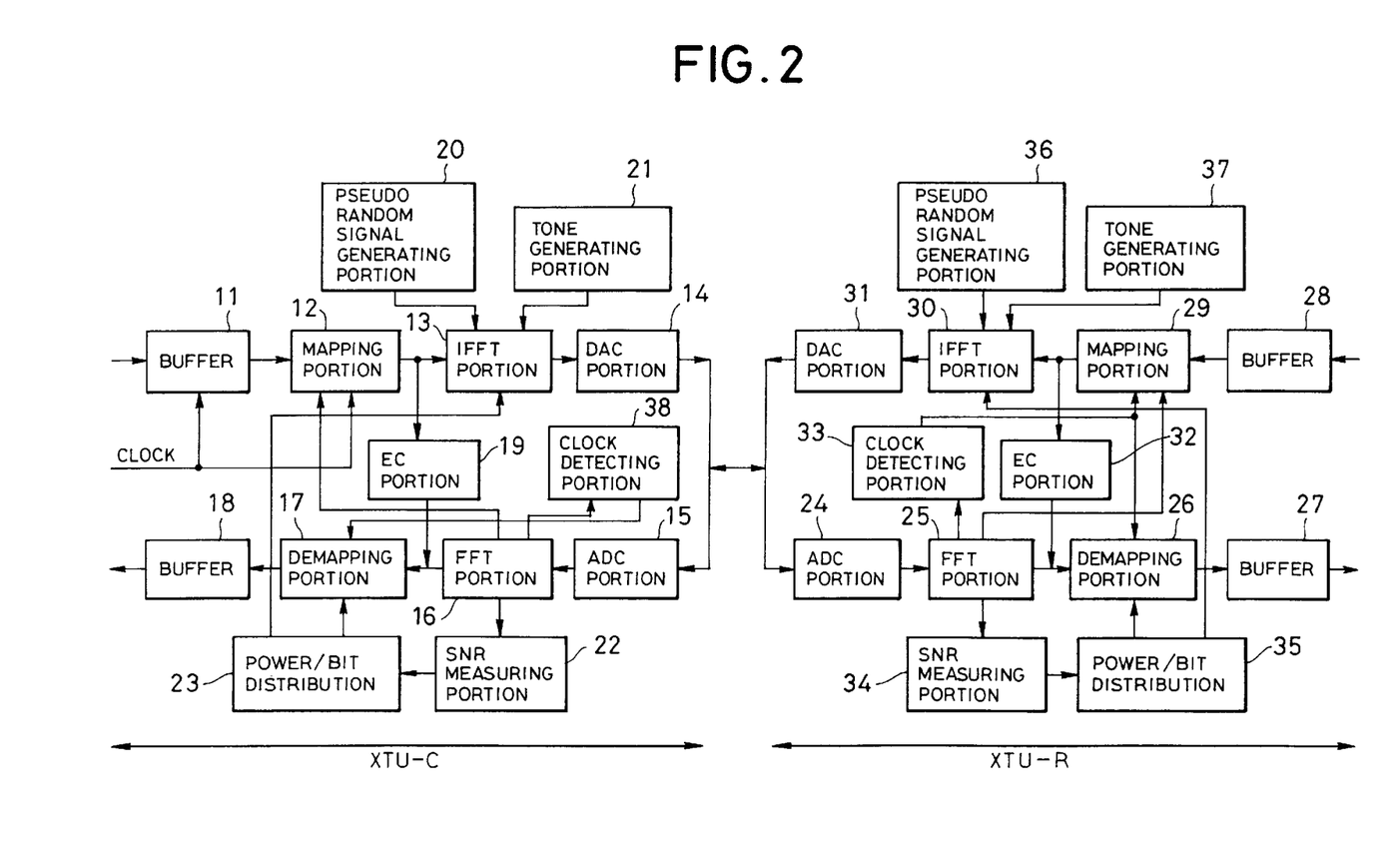
FIG. 2 is a block diagram showing a preferred embodiment of a multi-carrier transmission system according to the present invention.

Referring to FIG. 2, a function (transmitting portion 3) in down direction of XTU-C1 includes a buffer 11 temporarily accumulating an input data, a mapping portion 12 performing power distribution and bit distribution depending upon a period of noise (detail will be discussed later), an Inverse First Fourier Transforming (IFFT) portion 13 modulating and multiplexing a multi-value Quadrature Amplitude Modulation (QAM) signal as a mapping output, and a Digital to Analog Converter (DAC) portion 14 transmitting a multiplexed output as a down signal with analog conversion.

On the other hand, a function (receiving portion 5) includes an Analog to Digital Converter (ADC) portion 15 converting a transmitted signal into a digital signal, a Fast Fourier Transforming (FFT) portion 16 demodulating the digital signal, a demapping portion 17 receiving a transmitted signal with switching bit distribution depending upon a period of sound and a buffer portion 18 for adjusting variation of data transmission amount depending upon bit distribution. It should be noted that EC portion 19 is a block having an echo canceller function.

Furthermore, in order to realize the present invention, the XTU-C1 has a pseudo random signal generating portion 20, a tone generating portion 21, an SNR measuring portion 22 and a power/bit distribution calculating portion 23. The pseudo random signal generating portion 20 generates a pseudo random signal including all carrier to output to the IFFT portion 13. The tone generating portion 21 generates a tone to output to the IFFT portion 13. The SNR measuring portion 22 has a function for deriving SNR of the pseudo random signal transmitted from XTU-R2. The power/bit distribution calculating portion 23 derives power distribution and bit distribution of each carrier per noise period according to the measured SNR to output to the IFFT portion 13 and the demapping portion 17.

On the other hand, a function (receiving portion 4) of down direction of XTU-R2 has an ADC portion 24 converting the transmitted signal into a digital signal, an FFT portion 25 demodulating the digital signal, a demapping portion 26 receiving the transmitted signal with switching bit distribution depending upon a period of the noise, and a buffer 27 for adjusting variation of data transmission amount depending upon bit distribution.

A function (transmitting portion 6) of up direction of XTU-R2 has a buffer 28 temporarily accumulating an input data, a mapping portion 29 performing power distribution and bit distribution of respective carrier depending upon period of the noise (detail will be discussed later), an IFFT portion 30 modulating and multiplexing a multi-value QAM signal as mapping output with respective carriers and a DAC portion 31 transmitting the multiplexed output as analog converted up signal.

Furthermore, in order to realize the present invention, XTU-R2 has a pseudo random signal generating portion 36, an SNR measuring portion 34 and a power/bit distribution calculating portion 35. The pseudo random signal generating portion 36 generates a pseudo random signal containing all carrier to output to the IFFT portion 30. The SNR measuring portion 34 has a function for deriving SNR of the pseudo random signal transmitted from XTU-C1 per noise period. The power/bit distribution calculating portion 35 calculates the power distribution and the bit distribution of each carrier per each noise period on the basis of the SNR measured by the SNR measuring portion 34 to output to the IFFT portion 30 and the demapping portion 26.

Figure 3:
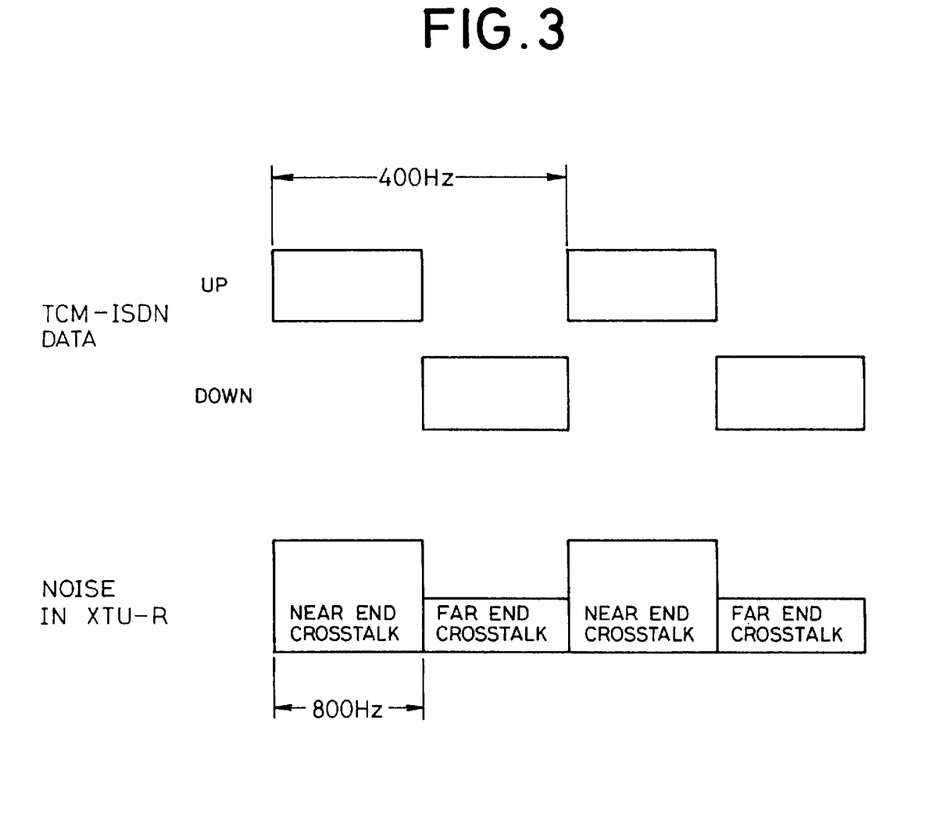
FIG. 3 is a diagrammatic illustration showing an example of kind and period of noise.

It should be noted that a clock on the side of XTU-C1 is a clock synchronized with the noise period. In this case, the noise period is assumed to be known. For example, the noise is a crosstalk from a Time Compression Multiplexing (TCM) type ISDN, near end crosstalk and far end crosstalk are alternately occur at every 800 Hz as shown in FIG. 3, the SNR of respective carriers should be varied every 800 Hz. Therefore, in the transmitting portion 3 of XTU-C1, it becomes necessary to receive a clock of 800 Hz and transmit the received clock to the receiving portion 4 of XTU-R2.

Namely, the receiving portion 4 is required to calculate a reception SNR of respective carrier per the period. Accordingly, as means for knowing the period, the tone from the tone generating portion 21 is transmitted to XTU-R2 by controlling the level in synchronism with the clock in the transmitting portion of XTU-C1. Clock period, namely noise period, can be detected by a clock detector 33. The detection period is output to the mapping portion 29 and the demapping portion 26.

Then, the tone generating portion 37 is provided even in the transmitting portion of XTU-R2. The tone from the tone generating portion 37 is transmitted to XTU-C1 by controlling the level in synchronism with the clock. The clock detector 38 is also provided in XTU-C1 for enabling detection of the clock period.

It should be noted that these clock may be input externally from the device, and in the alternative, may be generated internally from the device. A command to be a trigger for initiating transmission may also be generated by the central office per se. The clock may also be generated by a terminal office as other device.

On the other hand, in the construction shown in FIG. 1, dedicated tone generating portions 21 and 37 are provided in XTU-C1 and XTU-R2. However, it is also possible to use a known pilot tone employed in ISDN in place, without providing the dedicated tone generating portion. Thus, it becomes unnecessary to provide the dedicated tone generating portion to reduce hardware amount.

Figure 4:
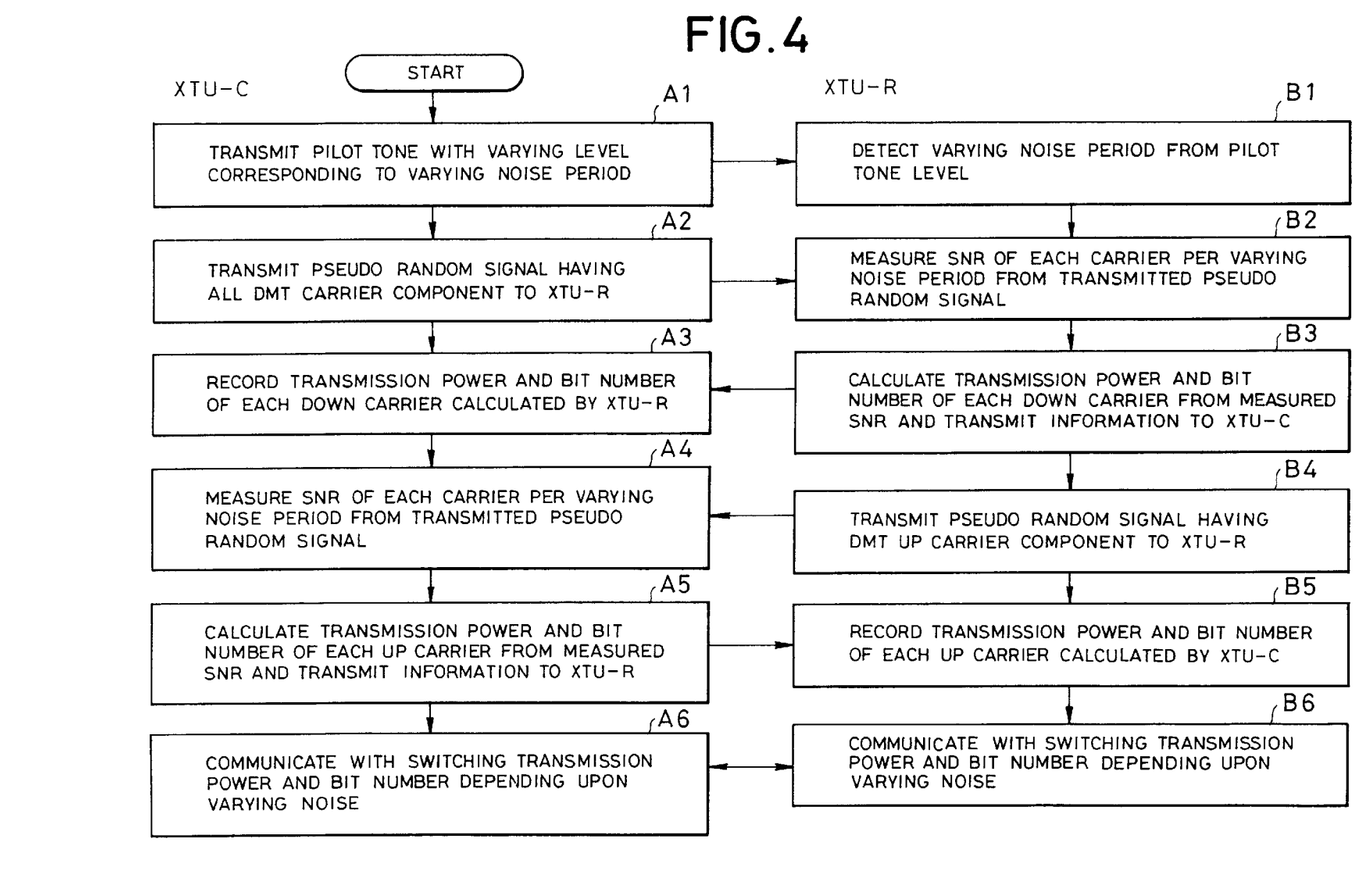
FIG. 4 is a flowchart showing operation of the preferred embodiment of the multi-carrier transmission system according to the present invention.

FIG. 4 is a flowchart showing operation of the embodiment of the multi-carrier transmission system according to the present invention. In FIG. 4, an arrow directed from up to down represents flow of operation in the same system. An arrow toward left or right shows flow of communication between devices.

Referring to FIG. 4, in order to detect a period of varying noise in the receiving portion 4 of XTU-R2 in FIG. 1, the transmitting portion 3 of XTU-C1 transmits tone from the tone generating portion 21 with varying the level depending upon (in synchronism with) the clock synchronized with periodically varying noise (step A1). The receiving portion 4 of XTU-R2 detects period of the noise on the basis of variation of level of the tone by the clock detecting portion 33 (step B1).

In order to derive the power distribution and bit distribution of respective carrier of DMT in down direction, the pseudo random signal from the pseudo random signal generating portion 20 in the transmitting portion 3 of XTU-C1 is transmitted (step A2). The pseudo random signal has components of all carriers of DMT. According to American National Standards Institute (ANSI) standard, the pseudo random signal contains two-hundreds and fifty-six carriers.

The pseudo random signal is received by the receiving portion 4 of XTU-R2. Then, SNR of the pseudo random signal is measured by the SNR measuring portion 34 per a period detected by step B1 (step B2). Number of bits of each carrier and transmission power are derived by the power/bit distribution calculating portion 35. The derived information is stored in the demapping portion 26 and is transmitted to XTU-C1 via the IFFT portion 30 (step B3). In XTU-C1, the transmitted bit distribution and transmission power distribution are stored in the mapping portion 12 as down carrier information (step A3).

The foregoing is the process for deriving the bit distribution and transmission power distribution of down carrier. The following is the process for deriving the bit distribution and transmission power distribution of up carrier. The pseudo random signal (thirty-two carriers in ANSI standard) from pseudo random signal generator 36 in the transmitting portion 6 of XTU-R2 is transmitted to XTU-C1 (step B4). In the receiving portion 5 of XTU-C1, SNR is measured per clock period synchronized with the noise on the basis of pseudo random signal transmitted by the SNR measuring device 22 (step A4).

By the measured SNR, bit number and transmission power of each carrier are calculated by power/bit distribution calculating portion 23. The information is stored in the demapping portion 17 and is transmitted to XTU-R2 via the IFFT portion 13 (step A5). In XTU-R2, the transmitted bit distribution and transmission power distribution are stored in the mapping portion 29 as up carrier information (step B5).

At the same time of initiation of communication, in transmission in the down direction, the transmitting portion 3 of XTU-C1 performs data transmission with switching bit distribution and transmission power distribution of two kinds (in the embodiment of FIG. 3) stored per varying noise period (step A6). Then, the receiving portion 4 of XTU-R2 extracts transmitted DMT data on the basis of the bit number stored in the demapping portion 26. It should be appreciated that since the bit distribution is varied periodically, the transmission amount is varied. The variation is adjusted by buffer 27.

On the other hand, in the transmission of up direction, the transmitting portion 6 of XTU-R2 performs data transmission by two kinds of bit distribution and transmission power distribution (in the example of FIG. 3) stored depending upon varying noise period (step B6). Then, the receiving portion 5 of XTU-C1 extracts the transmitted DMT data on the basis of bit number stored in the demapping portion 17. By buffer 18, transmission amount is adjusted variation caused due to periodic bit distribution.

Figure 5:
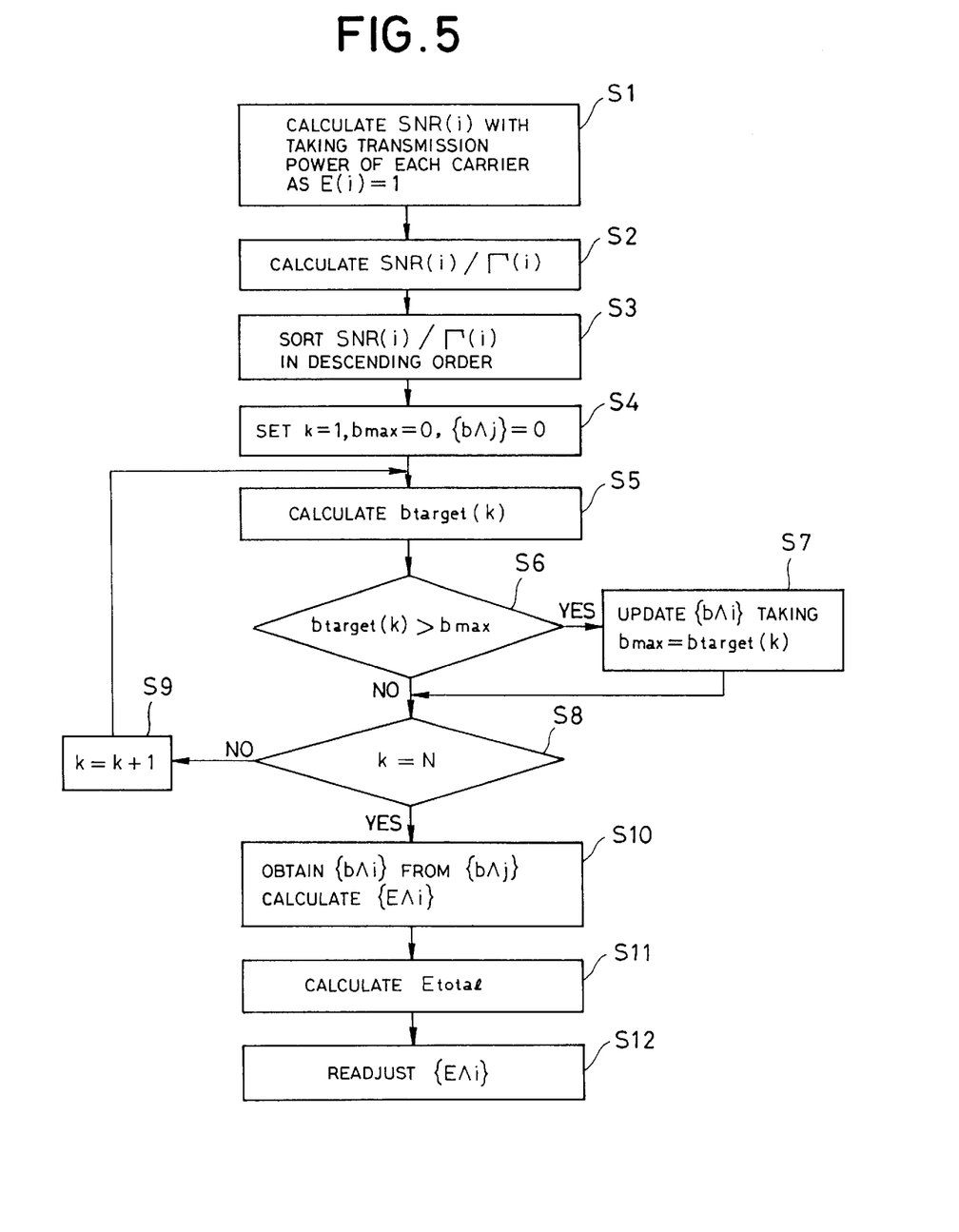
FIG. 5 is a flowchart generally showing example of calculation of power distribution and bit distribution in the preferred embodiment of the multi-carrier transmission system.

Next, referring to FIG. 5, one example of calculating method of transmission power and bit number of each carrier at steps A5 and B3 of FIG. 4 will be discussed briefly. A normalized SNR(i) is derived with taking the transmission power of each carrier i as E(i) (step S1). Then, SNR(i)/Γ(i) is calculated (step S2). Here, Γ(i) is referred to as "$SNR_{gap}$" expressed as follow:

$$\Gamma(i) = [Q^{-1}(P_e/n_c)]^2 + \gamma_{margin} - \gamma_{eff} - 4.77 (dB)$$

wherein $\gamma_{margin}$ is a performance margin of the system and $\gamma_{eff}$ is a code gain in an error correction.

Next, the value of SNR(i)/Γ(i) is sorted in descending order (step S3). Here, correspondence a carrier number (i) of original and the sorted carrier number (i) is stored. Then, k=1, $b_{max}=0$ and {bΛj}=0 are assumed (step S4). Here, k is a counted value, {bΛj} is bit number per each carrier, and $b_{max}$ is a total value of the transmission amount.

Then, $b_{target}(k)$ is derived by the following equation (step S5):

$$b_{target}(k) = \Sigma b_j$$

wherein Σ is a sum of j=1 to k, $b_{target}(k)$ is a total amount of the transmission amount in the case where k in number carrier are used, and wherein $b_j$ takes smaller one of $$\text{round}[\log_2\{1 + E_{target} SNR(j)/k)/\Gamma(i)\}]$$

and $$\text{floor}[\log_2\{1 + E_{max} SNR(j)/k)/\Gamma(i)\}]$$

It should be noted that round represents counting fraction over ½ as one and disregarding the rest and floor represents omission of fractions.

If $b_{target}(k) > b_{max}$, $b_{max} = b_{target}(k)$ is established (steps S6 and S7). Then, the bit distribution $b_j$ of each carrier at this time is stored as bΛj. If k is not equal N, k=k+1 is assumed (step S9). Then, process returns to step S5. If k=N (step S8), the process is advanced to step S10. At this time, $b_{max}$ becomes a maximum transmission amount, and bΛj becomes bit distribution of each carrier at that time. Obtain bΛi resorted from bΛj, a transmission power EΛi of each carrier is derived (step S10).

Then, as total power $E_{total}$, $$E_{total} = E\Lambda i$$

is derived (step S11). It should be noted that, in this case, Σ is a sum of i=0 to N−1. Then, final $E_i$ is derived as smaller one of:

$$E_{target} E\Lambda i/E_{total} \text{ or } E_{max,i}$$

(step S12). Here, $E_{target}$ is preliminarily provided as a maximum value of total power. $E_{max}$ is an allowable extreme value per carrier.

In the foregoing embodiment, there has been disclosed the case where the period of noise is 200 Hz as shown in FIG. 3 and noises are two kinds. This shows merely one example and three or more kinds of noises or various values of periods may be taken as known in the art. Detail of calculation method shown in FIG. 5 has been disclosed in U.S. Pat. No. 5,479,447. However, the calculation method is not limited to the disclosed method.

As set forth above, according to the present invention, by controlling bit distribution and power distribution depending upon noise period, transmission amount can be increased even in the case where noise is relatively small. Thus, improvement transmission efficiency can be achieved.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A multi-carrier transmission system comprising:
   a receiving portion configured to derive a bit distribution of each carrier of a multi-carrier transmission system depending upon a periodically varying noise period; and
   a transmitting portion configured to transmit data in accordance with the derived bit distribution.

2. A multi-carrier transmission system as set forth in claim 1, wherein said bit distribution of each of said carrier is derived by using a clock synchronized with said periodically varying noise and depending upon a period of said clock.

3. A multi-carrier transmission system as set forth in claim 1, wherein a transmission power distribution of each of said carrier is derived together with the bit distribution of each of said carrier.

4. A multi-carrier transmission system as set forth in claim 2, which comprise:
   a first unit performing quadrature amplitude modulation using each of said carrier and multiplexing modulated carrier using inverse Fourier transformation; and
   a second unit demodulating each of said carrier from the signal multiplexed in said first unit using Fourier transformation.

5. A multi-carrier transmission system as set forth in claim 4, wherein said first unit comprises a circuit for transmitting a tone synchronized with said clock with varying level and a circuit for transmitting a pseudo random signal having all components of respective carriers, and
   said second unit comprises a circuit for detecting a period of noise on the basis of the level of said tone from said first unit, a circuit for deriving a signal to noise ratio of said pseudo random signal per detected period and a circuit for deriving one of a transmission power distribution and bit distribution, and bit distribution of said carrier on the basis of said signal to noise ratio.

6. A multi-carrier transmission system as set forth in claim 5, wherein said second circuit comprises a circuit or transmitting any one of derived transmission power distribution and said bit distribution, and said bit distribution of each of said carrier to said first unit, and said first unit comprises a circuit for performing data transmission to said second unit according to one of said transmission power distribution and bit distribution, and said bit distribution per said noise period from said second unit.

7. A multi-carrier transmission system as set forth in claim 5, wherein said second unit comprises a circuit for transmitting a pseudo random signal having all components of each of said carriers, and
   said first unit comprises a circuit for deriving a signal to noise ratio of said pseudo random signal from said second unit per each noise period, and a circuit for deriving one of a transmission power distribution and bit distribution, and bit distribution of said carrier on the basis of said signal to noise ratio.

8. A multi-carrier transmission system as set forth in claim 7, wherein said first unit comprises a circuit for transmitting the transmission power distribution and the bit distribution of each of said carriers derived to said second unit,
   said second unit comprises a circuit for performing data transmission to said first unit according to one of said transmission power distribution and bit distribution, and said bit distribution per said noise period from said first unit.

9. A multi-carrier transmission system as set forth in claim 4, wherein said first unit initiates transmission operation in response to a transmission start command from said second unit.

10. A multi-carrier transmission system as set forth in claim 1, wherein a data transmission through a digital subscriber line is performed between a first unit and a second unit.

11. A multi-carrier transmission system as set forth in claim 1, wherein said bit distribution is effected to distribute a greater number of bits when said noise periodically varying between a higher and a lower volume is a smaller value than that when said noise is a larger value.

12. A multi-carrier transmission system as set forth in claim 1, wherein said bit distribution is effected to distribute greater number of bits when said noise periodically varying is far end crosstalk than that when said noise is near end crosstalk.

13. A multi-carrier transmission unit comprising:
   a receiving portion configured to derive a bit distribution of each carrier of said multi-carrier transmission unit depending upon a period of periodically varying noise; and
   a transmitting portion configured to transmit data in accordance with the derived bit distribution.

14. A multi-carrier transmission unit as set forth in claim 13, wherein said bit distribution of each of said carrier is derived by using a clock synchronized with said periodically varying noise and depending upon a period of said clock.

15. A multi-carrier transmission unit as set forth in claim 13, wherein a transmission power distribution of each of said carrier is derived together with the bit distribution of each of said carrier.

16. A multi-carrier transmission unit as set forth in claim 14, which performs quadrature amplitude modulation using said each carrier and multiplies the modulated carrier using inverse Fourier transformation.

17. A multi-carrier transmission unit as set forth in claim 14, which further comprises a circuit for transmitting a tone synchronized with said clock with varying level and a circuit for transmitting a pseudo random signal having all components of respective carriers.

18. A multi-carrier transmission unit as set forth in claim 17, which further comprises a circuit for detecting a period of noise on the basis of the level of a said tone from another unit, a circuit for deriving a signal to noise ratio of said pseudo random signal per detected period and a circuit for deriving one of a transmission power distribution and bit distribution, and bit distribution of said carrier on the basis of said signal to noise ratio.

19. A multi-carrier transmission unit as set forth in claim 18, which further comprises a circuit for transmitting any one of derived transmission power distribution and said bit distribution, and said bit distribution of each of said carrier to said another unit.

20. A multi-carrier transmission unit as set forth in claim 17, which further comprises a circuit for deriving a signal to noise ratio of said pseudo random signal from said another unit per each noise period, and a circuit for deriving one of a transmission power distribution and bit distribution, and bit distribution of said carrier on the basis of said signal to noise ratio.

21. A multi-carrier transmission unit as set forth in claim 18, which further comprises a circuit for transmitting one of the transmission power distribution and the bit distribution, and said derived bit distribution of each of said carriers, to said another unit.

22. A multi-carrier transmission unit as set forth in claim 18, which initiates transmission operation in response to a transmission start command from said another unit.

23. A multi-carrier transmission unit as set forth in claim 18, wherein the transmission unit performs data transmission through a digital subscriber line to said another unit.

24. A multi-carrier transmission unit as set forth in claim 13, wherein said bit distribution is effected to distribute a greater number of bits when said noise periodically varying between a higher and a lower volume is a smaller value than that when said noise is a larger value.

25. A multi-carrier transmission unit as set forth in claim 13, wherein said bit distribution is effected to distribute greater number of bits when said noise periodically varying is far end crosstalk than that when said noise is near end crosstalk.

26. A multi-carrier transmission method comprising:
    deriving a bit distribution of each carrier of a multi-carrier system depending upon a periodically varying noise period; and
    transmitting data in accordance with the derived bit distribution.

27. A multi-carrier transmission method as set forth in claim 26, wherein said bit distribution of each of said carrier is derived by using a clock synchronized with said periodically varying noise and depending upon a period of said clock.

28. A multi-carrier transmission method as set forth in claim 26, wherein a transmission power distribution of each of said carrier is derived together with the bit distribution of each of said carrier.

29. A multi-carrier transmission method as set forth in claim 27, wherein quadrature amplitude modulation is perform by using each of said carrier and the modulated carrier is multiplexed using inverse Fourier transformation in a first unit, and each of said carrier is demodulated from the signal multiplexed in said first unit using Fourier transformation in a second unit.

30. A multi-carrier transmission method as set forth in claim 27, wherein in said first unit, a tone is transmitted synchronized with said clock with varying level and a pseudo random signal having all components of respective carriers is transmitted, and
    in said second unit, a period of noise is detected on the basis of the level of said tone from said first unit, a signal to noise ratio of said pseudo random signal per detected period is derived and one of a transmission power distribution and bit distribution, and bit distribution of said carrier is derived on the basis of said signal to noise ratio.

31. A multi-carrier transmission method as set forth in claim 30, wherein in said second circuit, any one of derived transmission power distribution and said bit distribution, and said bit distribution of each of said carrier is transmitted to said first unit, and in said first unit, data transmission to said second unit is performed according to one of said transmission power distribution and bit distribution, and said bit distribution per said noise period from said second unit.

32. A multi-carrier transmission method as set forth in claim 30, wherein in said second unit, a pseudo random signal having all components of each of said carriers is transmitted, and
    in said first unit, a signal to noise ratio of said pseudo random signal from said first unit per each noise period is derived, and one of a transmission power distribution and bit distribution, and bit distribution of said carrier on the basis of said signal to noise ratio is derived.

33. A multi-carrier transmission method as set forth in claim 32, wherein in said first unit, the transmission power distribution and the bit distribution of each of said carriers derived to said second unit is transmitted, and
    in said second unit, data transmission to said first unit is performed according to one of said transmission power distribution and bit distribution, and said bit distribution per said noise period from said first unit.

34. A multi-carrier transmission method as set forth in claim 29, wherein transmission operation is initiated in response to a transmission start command from said second unit.

35. A multi-carrier transmission method as set forth in claim 26, wherein a data transmission through a digital subscriber line is performed between said first unit and said second unit.

36. A multi-carrier transmission method as set forth claim 26, wherein said bit distribution is effected to distribute a greater number of bits when said noise periodically varying between a higher volume and a smaller volume is a smaller value than that when said noise is a larger value.

37. A multi-carrier transmission method as set forth in claim 26, wherein said bit distribution is effected to distribute greater number of bits when said noise periodically varying is far end crosstalk than that when said noise is near end crosstalk.

38. A multi-carrier transmission system comprising:
    means for deriving a bit distribution for each carrier of the multi-carrier transmission system based upon a periodically varying noise period;
    means for transmitting data through the multi-carrier transmission system in accordance with the derived bit distribution.

39. The system of claim 38, further comprising:
    a center means for transmitting a tone of varying levels in accordance with a clock synchronization means and for transmitting a pseudo-random signal having all components of respective carriers;
    a remote means for detecting a period of noise on the basis of the levels of said tone from said center unit; and
    a derivation means coupled to said remote means, said derivation means for deriving a signal to noise ratio of said pseudo-random signal per detected period, and for deriving one of a bit distribution and a transmission power distribution, based on said signal to noise ratio.

* * * * *